(12) United States Patent
Codella et al.

(10) Patent No.: US 6,804,818 B1
(45) Date of Patent: Oct. 12, 2004

(54) INTEGRATION MECHANISM FOR OBJECT-ORIENTED SOFTWARE AND MESSAGE-ORIENTED SOFTWARE

(75) Inventors: Christopher F. Codella, Marlboro, NY (US); Donald F. Ferguson, Yorktown Heights, NY (US); Ignacio Silva-Lepe, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/302,043

(22) Filed: Apr. 29, 1999

(51) Int. Cl.[7] .................................................. G06F 9/44
(52) U.S. Cl. ........................ 719/315; 717/106; 717/107; 717/108; 717/116; 717/117; 717/137
(58) Field of Search ..................... 709/315, 200–253; 707/103; 717/100–167; 719/313–317

(56) References Cited

U.S. PATENT DOCUMENTS

| | | | | |
|---|---|---|---|---|
| 6,061,721 A | * | 5/2000 | Ismael et al. ............... | 709/223 |
| 6,230,160 B1 | * | 5/2001 | Chan et al. ................. | 707/103 |
| 6,321,261 B1 | * | 11/2001 | Glass ......................... | 709/223 |
| 6,425,017 B1 | * | 7/2002 | Dievendorff et al. ....... | 709/315 |

OTHER PUBLICATIONS

Gamma Erich "Design Patterns Elements of Reusable Object–Oriented Software" Addison–Wesley 1995 p. 223–232.*

* cited by examiner

*Primary Examiner*—Thomas Lee
*Assistant Examiner*—Charles Anya
(74) *Attorney, Agent, or Firm*—F. Chau & Associates, LLC

(57) ABSTRACT

In accordance with the present invention, methods are included, which may be implemented by employing a program storage device readable by machine, tangibly embodying a program of instructions executable by the machine to perform method steps for anonymously integrating an object oriented software component with message oriented clients. A method is included for anonymously integrating object-oriented software components and message-oriented clients wherein a first object-oriented component performs the steps of performing invocations which are serviced by one of message-oriented clients and object-oriented components and servicing the invocations which are performed by one of the message-oriented clients and the object-oriented components such that the first object-oriented component is unaware that the invocations are performed and serviced by one of the message-oriented clients and the object-oriented components.

32 Claims, 3 Drawing Sheets

INTEGRATION MECHANISM FOR OBJECT-ORIENTED SOFTWARE AND MESSAGE-ORIENTED SOFTWARE

BACKGROUND OF THE INVENTION

1. Field of the Invention

The present invention relates to system managed message and object exchanges, and more particularly to an integration mechanism for sending and receiving anonymous invocations.

2. Description of the Related Art

With the continuing growth of distributed systems, such as, the Internet or computer networks, electronic communication has become increasingly more important. Objects in distributed systems communicate by sending requests or messages to known objects. Each request or message denotes the invocation of a method on the known object. To reply to a request or message, an object may send an object or objects as a return value of the invocation or as the value of one or more of the invocation's out parameters. One characteristic of this paradigm is that the sending object and the receiving object are coupled by the given request or message. Each object is aware of the other object's identity in a one-to-one relationship, and the interaction is inherently synchronous.

Message oriented middleware is related to sending messages. The messages convey some application specific data that are sent with no specific or even necessarily known individual receiver defined. Rather, such messages are collected in some form of destination, for example, a queue, to be consumed by other applications that are clients of the messaging system. Messages may be replied to by sending yet another message that is correlated to the initial message. Clients or users of the messaging system are not necessarily aware of each other's existence, and the interaction between peer clients is inherently asynchronous. The decoupling of the sender and receiver may be thought of as using anonymous invocations.

For example, Enterprise Java™ Bean (EJB) components which are distributed objects that adhere to the EJB component specification and that consequently communicate with clients or users and with each other via synchronous method calls, can benefit from the added flexibility offered by a message based, asynchronous interface, that is from using anonymous invocations. EJBs may then be assembled with clients and peers using both styles of interaction, i.e., synchronous and asynchronous. Further, EJBs are capable of reacting to messages originating outside the EJB (or other component) based application, such as an existing message-based applications, or integrated set of applications.

As entities move toward integrating existing applications and developing new applications, middleware which provides a coherent and easy to use integration capability has become increasingly more important. Primarily two styles of integration middleware exist into which most products may be classified. These styles include message oriented middleware (MOMW) and object oriented middleware (OOMW). Each style addresses different aspects of the integration problem. MOMW provides easy integration of existing applications with minimal modification and needs only a small amount of additional code. New applications can be built with OOMW which integrate substantially unmodified existing applications represented as objects with new, top-down designed objects possibly based on models. Each of the two identified styles has unique strengths which make one of the styles more preferable in different situations.

While it has been attempted to employ MOMW and OOMW together, e.g., application adapters, embedding MQ code within Business Objects, a unified component model does not exist which provides a coherent and easy way to combine the two styles.

Therefore, a need exists for a unified component model for middleware integration which employs the advantages of both OOMW and MOMW. A further need exists for an integration mechanism which provides for easy implementation of anonymous invocations.

SUMMARY OF THE INVENTION

In accordance with the present invention, methods are included, which may be implemented by employing a program storage device readable by machine, tangibly embodying a program of instructions executable by the machine to perform method steps for anonymously integrating an object oriented software component with message oriented clients. A method is included for anonymously integrating object-oriented software components and message-oriented clients wherein a first object-oriented component performs the steps of performing invocations which are serviced by one of message-oriented clients and object-oriented components and servicing the invocations which are performed by one of the message-oriented clients and the object-oriented components such that the first object-oriented component is unaware that the invocations are performed and serviced by one of the message-oriented clients and the object-oriented components.

In alternate methods, which may be implemented using a program storage device, the step of receiving asynchronous replies to the invocations performed by the first object-oriented component by employing a helper object may be included. The helper object may include a result proxy object or a callback proxy object. The step of replying to the invocations serviced by the first object-oriented component by performing separate invocations may be included. The step of receiving asynchronous replies to the invocations performed by the first object-oriented component by receiving separate invocations may be included. The invocations may be received and serviced synchronously by the first object-oriented component. The steps of requesting to receive the invocations by the first object-oriented component and receiving the invocation pursuant to the request by the first object-oriented component may be included. The first object-oriented component preferably includes at least one message bean. The step of servicing the invocations may include the step of creating an instance to obscure sender information of the invocations by employing a message proxy to interface between the first object-oriented component and a destination of the invocations. The invocations preferably include java™ message system messages, and the method may further include the step of providing a message bean listener for adapting the java™ message system messages for performance by the first object-oriented component.

In accordance with the present invention, further methods are included, which may be implemented by employing a program storage device readable by machine, tangibly embodying a program of instructions executable by the machine to perform method steps for anonymously performing and servicing invocations. One method for anonymously performing and servicing invocations includes the steps of providing an object-oriented message bean listener for receiving and replying to invocations from a source destination, permitting a message bean to obtain an instance of a message proxy on which the message bean invokes a method to associate the invocation with a target destination, replying to the message bean from the message proxy, when the message bean expects a reply to the invocation, wherein the message bean is unaware of the identity of one of a message-oriented client and an objection-oriented component that one of services and performs the invocation.

In alternate methods, which may be implemented by employing a program storage device, the step of storing message formats that are mapped to and from signatures for methods to be implemented by message proxies and message beans may be included. The step of replying to the message bean may include the step of replying by performing separate invocations by employing a helper object. The step of replying to the message bean may include the step of receiving asynchronous replies to the invocations performed by the message bean by employing a helper object. The step of replying to the message bean may include the step of receiving asynchronous replies to the invocations performed by the message bean by receiving separate invocations. The invocations may be received and serviced synchronously by the message bean. The steps of requesting to receive the invocations by the message bean and receiving the invocations pursuant to the request by the message bean may also be included.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to an integration mechanism which manages message and object exchanges, and more particularly to an integration mechanism for sending and receiving anonymous invocations. The integration mechanism preferably integrates software written using Object-Oriented Middleware (OOMW) with software using Message-Oriented Middleware (MOMW). This integration mechanism may include the following architectural components: a message bean, a message proxy, a result proxy, a callback proxy, a message bean listener, a message context, a number of destinations, a number of input ports, a number of output ports, a container that orchestrates the previous components at run-time, and a message repository. These components and their function will be described in greater detail below. The integration mechanism permits an object-oriented component, heretofore referred to as a message bean, to perform anonymous invocations that are serviced by other message beans or by message-oriented servers in such a way that the requesting message bean is unaware of whether the server of the anonymous invocation is either a message bean or a message-oriented server.

Likewise, the integration mechanism permits a message bean to service an anonymous invocation with any one of the message bean's methods such that the message bean is unaware that the anonymous invocation the message bean is servicing has been performed by either another message bean or by a message-oriented client or user.

The integration mechanism also permits a message-oriented client to send messages that can be received and served by an object-oriented component without the message oriented client being aware that the message may have been a message bean that received and served the message the message bean sent. Similarly, the integration mechanism permits a message-oriented client to receive and serve messages without the client being aware that such messages may have been originated by a message bean.

Figure 1:
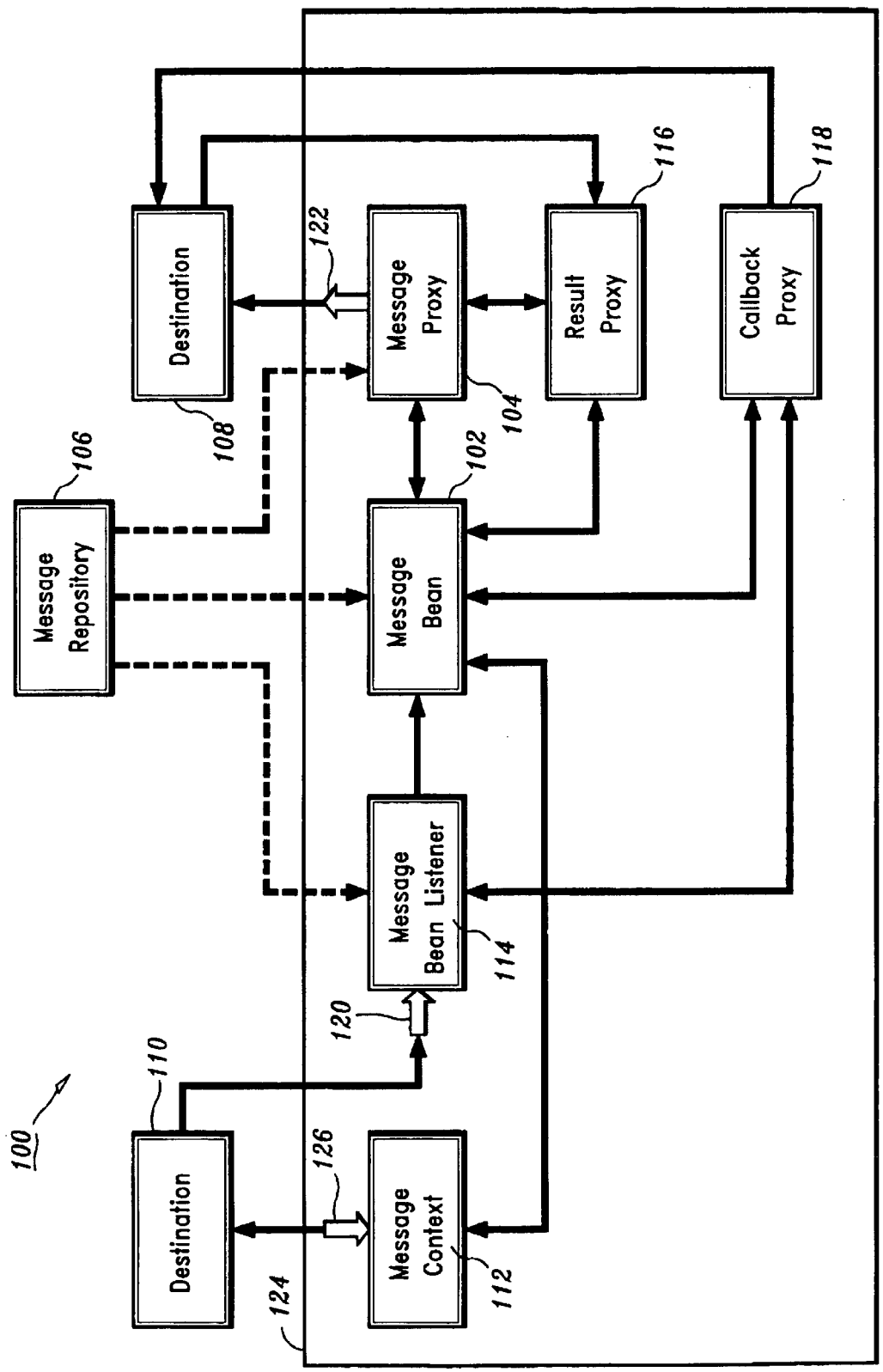
FIG. 1 is a block/flow diagram for a system/method of an integration mechanism in accordance with the present invention.
Figure 2:
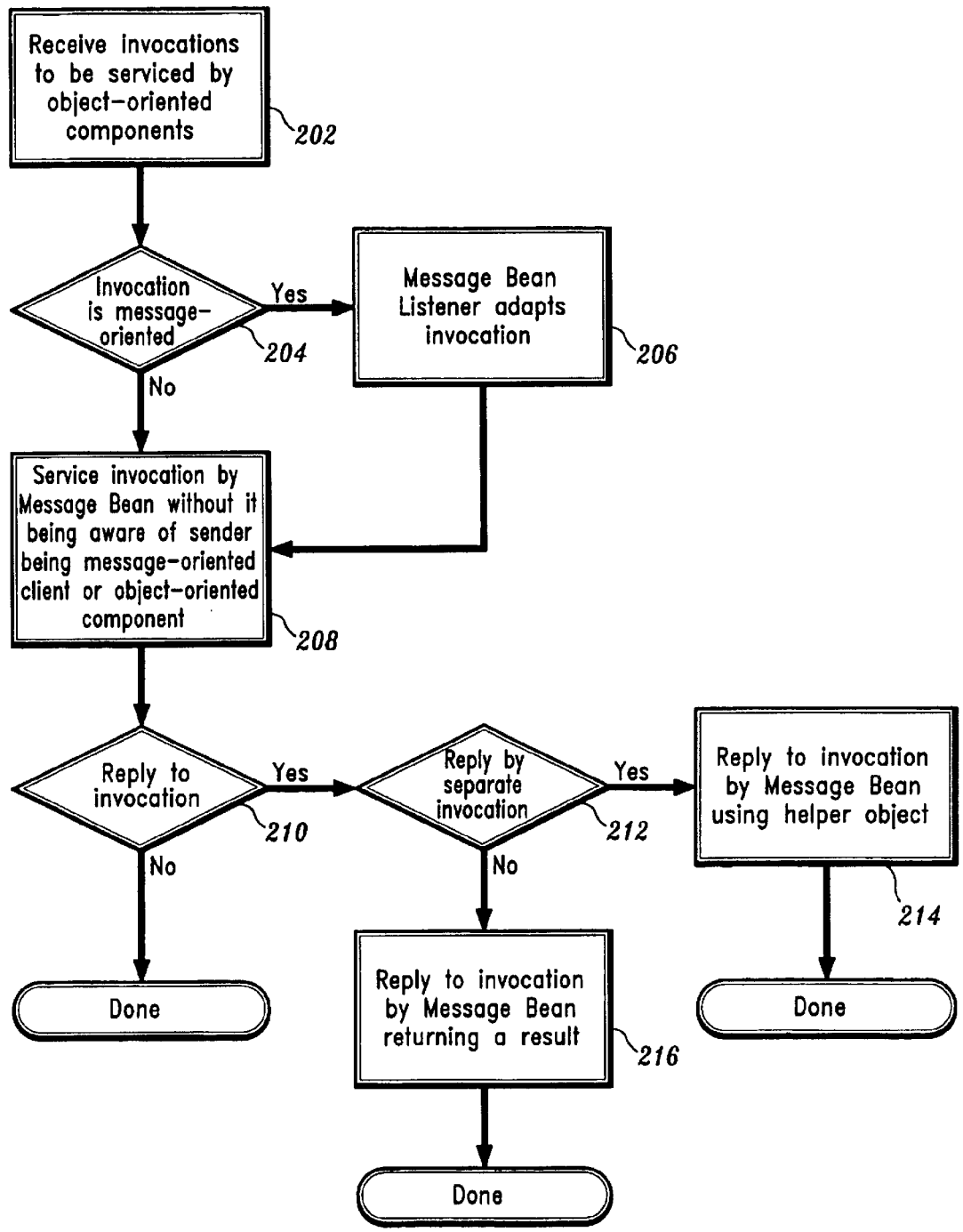
FIG. 2 is a block/flow diagram for servicing anonymous invocations in accordance with the present invention.
Figure 3:
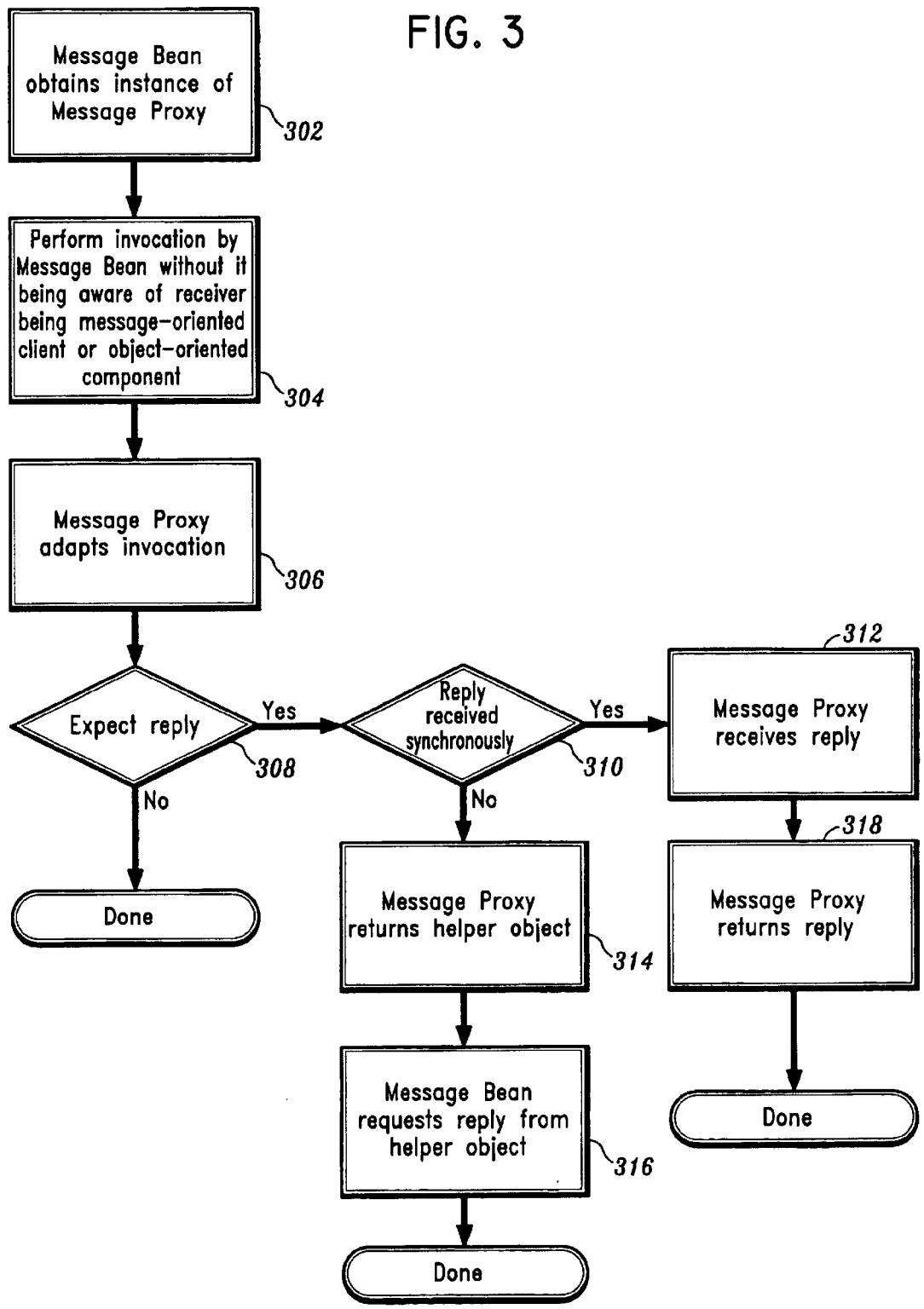
FIG. 3 is a block/flow diagram for performing anonymous invocations in accordance with the present invention.

It should be understood that the elements shown in FIGS. 1–3 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a system/method in accordance with the present invention is shown. Message beans are introduced as an approach to integrate software components that use object-oriented middleware and those that use message-oriented middleware. A message bean is preferably an Enterprise Java™ Bean (EJB) (JAVA is a trademark of Sun Microsystems, Inc.) that can serve and perform anonymous invocations transparently. An anonymous invocation may be defined as a request for service that is delivered either as an object-oriented request or as a Java™ Message System (JMS) message. The design of message beans preferably builds upon concepts in the Java™ Message System (JMS) and its interfaces. The use of the JMS concepts as a unifying abstraction layer to isolate the design from specific characteristics of a particular messaging system will illustratively be employed to better describe the present invention. Beneath this abstraction layer may be any number of implementations ranging from light weight custom built infrastructures to industrial strength messaging middleware such as MQ SERIES (MQ SERIES is a trademark of IBM Corporation) family of middleware commercially available from IBM Corporation, or event driven publish/subscribe systems such as the Object Management Group's (OMG) Event and Notification specification known to those skilled in the art.

In its simplest and most transparent form, a message bean performs and serves anonymous invocations as if it was an EJB performing and serving object-oriented requests:

An integration mechanism 100 in accordance with the present invention illustratively includes a system architecture and flow as shown in FIG. 1. A message bean 102 can serve an anonymous invocation by having one of its methods invoked by a container 124 of message bean 102. Message beans 102 may include different methods and functions. Although theses methods and functions are described to illustrate the invention, they are not limiting to the concepts described herein. Although message beans and other elements may include different methods and functions, the message beans will be referred to generally as message bean(s) 102, and the other elements will be referred to generally as indicated in FIG. 1.

In one case, if an anonymous invocation is delivered as a JMS message, the container 124 performs the necessary actions to turn the received message into a method invocation. The message bean 102 can return a result from the invoked method that the container 124 can then translate into a message that is sent in response to the received message.

The message bean 102 can perform an anonymous invocation by making a request on a message proxy 104. In particular, if the anonymous invocation is to be delivered as a JMS message, the message proxy 104 performs the necessary actions to turn the invocation into a message that the message proxy 104 sends. If the method that a message bean 102 invokes on a message proxy 104 has a return value, then the message proxy 104 performs the necessary actions to receive a reply to the message the message proxy 104 sent and turn the message into a result value that it returns to the message bean 102.

In this form, a message bean provider writes the message bean 102 the same way that he or she would write any other EJB, with the only exception that a message proxy 104 is used to perform invocations, as opposed to locating a home and using the home to create or find an EJB to invoke. It may be up to an application assembler or a deployer to specify whether or not anonymous invocations are delivered as JMS messages and how.

If a message bean 102 serves anonymous invocations that are delivered as JMS messages, the interface that it implements, which may be implicitly defined by its EjBObject, conforms to an interface that may be defined in terms of the formats of the messages that result in the invocation of the message bean's methods. An interface is code which defines or specifies a set of services an object can provide. The definition of an interface in terms of message formats is done via a tool that is associated with a message repository 106. Similarly, if a message bean 102 performs anonymous invocations delivered as JMS messages, the message proxy 104 that the message bean 102 uses to perform the invocations implements an interface that has been defined in terms of message formats defined in the message repository 106.

A degree of transparency of a message bean 102 refers to the exposure that the message bean 102 has to the extent to which the code in the message bean is explicitly aware that the anonymous invocations that the message bean serves or performs are delivered as JMS messages. There are two main degrees of transparency: container-managed messaging and bean-managed messaging. Each one is discussed below.

Container-managed messaging will now be described. Interactions outlined above constitute the highest degree of transparency of a message bean. That is, the container 124 and the message proxy 104 provide enough infrastructure to allow the message bean 102 to be unaware that the anonymous invocations the message bean serves and performs may have been delivered as JMS messages. In addition, the message bean 102 serves and performs these invocations in a synchronous, request/response fashion that is natural for an EJB. This highest degree of transparency is also referred to as container-managed reaction.

Within container-managed messaging, there are further degrees of transparency that permit a message bean (in order of decreasing transparency) to:

1. Perform asynchronous invocations. Here, a message bean 102 can perform an invocation without blocking until a response arrives. The message proxy 104 that is used immediately returns a result proxy object from result proxy 116 that can listen for a result. When the message bean 102 decides that the message bean needs the result, the message bean asks the result proxy 116 for a result. If the result proxy 116 has not received a result yet, the message bean 102 then blocks.

2. Return a result by performing a separate invocation. Here, instead of performing a response to an anonymous invocation by returning a result from the method that serves the invocation, a message bean 102 performs an invocation on a separate callback proxy 118 to return the result.

3. Receive a response as a separate invocation. In this case, even though the message bean 102 expects a response from an anonymous invocation, the message bean 102 chooses not to receive the response as a result of the invocation itself. Rather, the message bean 102 specifies that a separate method will receive the response by servicing a correspondingly separate anonymous invocation. This is analogous to the dual communication channel that gets established when two message-oriented clients engage in a request/reply interaction.

4. Explicitly trigger the invocation of one of the message bean's methods. In this situation, a message bean 102 can perform the equivalent of a synchronous receive on its container 124, which then triggers the container 124 to request the receipt of a JMS message and to invoke the method in the message bean 102 that services the corresponding anonymous invocation.

5. Manipulate JMS messages explicitly as anonymous invocation parameters. This mode, also referred to as bean-managed reaction, allows a message bean 102 to still serve and perform anonymous invocations in the sense that the message bean's methods are invoked and the message bean invokes methods to receive and send JMS messages, respectively. However, a Message Bean manipulates JMS messages directly in this case. That is, when a Message Bean's method that services an anonymous invocation executes, the message bean is responsible for knowing the format of the JMS message the message bean gets passed in the invocation and for unpacking the invocation. Likewise, before a Message Bean performs an anonymous invocation, the message bean should know the format of the message to be sent and the message bean should pack the message and pass the message on to the message proxy 104. Bean-managed messaging gives a message bean more control over message formats, but bean-managed messaging also takes away some reusability as an EJB given the loss in transparency. Bean-managed messaging also presents a more complicated programming model.

Container-managed messaging is analogous to an EJB's container-managed persistence, where the container hides from an EJB the mechanisms used to store its persistent attributes in a backstore, thus simplifying the programming model. With container-managed messaging the container 124 manages connections, destinations, sessions, message producers and consumers, and other JMS facilities, separating these infrastructure tasks from the business logic or other functions in the message bean's methods. The result is a simpler programming model at the application level.

A message bean that uses bean-managed messaging is preferably an EJB that uses the JMS application programming interface (API) directly to integrate with message-oriented applications. This is analogous to an EJB's bean-managed persistence, where the EJB uses an API, such as JAVA Database Conductivity (JDBC) to manage the persistence of the EJB's state data, instead of delegating this management to the container. A message bean that uses bean-managed messaging is responsible for managing all aspects of interacting with JMS facilities, and its container does not provide it with such objects as a message Proxy, a result proxy or a callback proxy as described in accordance with the invention.

A message bean is initially developed by a message bean provider (client or user) who, depending on the degree of transparency of the message bean, knows more or less about the fact that the anonymous invocations the message bean services and performs are delivered as JMS messages. Given that a message bean uses message proxies to perform anonymous invocations, the message bean includes references to the message proxies in the message bean's deployment descriptor. A message proxy 102 reference includes:

1. The fully qualified name of the interface implemented by the message proxy 104. This interface name is specified by the message bean provider.

2. The fully qualified name of the class that implements the message proxy 104. This class name is specified by an application assembler or a deployer.

An interface that is implemented by a message proxy 104 may be obtained with the help of a tool that permits a message bean provider to discover the signatures of the methods the message bean provider needs to perform anonymous invocations on and to package such method signatures into the interface of the message proxy 104. Such a tool, to the extent possible, hides from the message bean provider the fact that the message signatures may be associated with a message repository 106 and that the tool composes method signatures from the message formats that the message repository 106 stores.

Similarly, the interface that the message bean implicitly implements, and which is defined by its EJBObject, can conform to an interface that includes method signatures that have been composed from message formats by a tool associated with the message repository 106.

To specify that a message bean services an anonymous invocation that is delivered as a JMS message, an input port 120 and 126 may be defined and added to the message bean's deployment descriptor. An input port 120 Or 126 may specify:

1. An input port name;
2. A destination 110 such as a JMS destination, that is used as the source of messages that deliver incoming anonymous invocations;
3. A reference to a JMS connection factory (which is a conceptual object or class of objects in the JMS specification for establishing connections with host messaging systems) that is associated with the message source;
4. The name of the message bean's method associated with the input port 120 or 126 and which the container 124 invokes when a message arrives at the message source; and
5. To specify that a message bean performs anonymous invocations that are delivered as JMS messages, the corresponding the message proxy 104 defines an output port 122 in the message proxy's deployment descriptor for each method in the message proxy's interface. An output port 122 may specify:

1. An output port name;
2. A destination 108, such as a JMS destination, that is used as the target to which messages are sent to deliver outgoing anonymous invocations;
3. A reference to a JMS connection factory associated with the message target;
4. The name of the message proxy's method associated with the output port 122 and whose invocation by a message bean triggers the message proxy 104 to send a message to the corresponding target; and
5. An optional JMS destination that is included in outgoing messages and that indicates the reply-to target to be used in responses to those outgoing messages;

Input and output ports are specified by either a message bean provider, an application assembler or a deployer, depending on the degree of transparency of the Message Bean. If a message bean chooses to receive a response as a separate invocation, then it needs to specify the input port 120 or 126 that includes the method to be invoked. If a message bean chooses to explicitly trigger the invocation of one of its methods, then the message bean needs to specify the input port 120 or 126 that includes the method to be invoked and the message bean needs to provide a reference to this input port to the container 124 at run time. In all other cases, a message bean provider does not need to specify input or output ports and the provider is thus unaware that the anonymous invocations it services or performs are delivered as JMS messages.

In some cases, an application assembler that uses a message bean to build an application may decide that the message bean is going to have the message bean's anonymous invocations delivered as JMS messages, in which case the application assembler specifies the input ports to include in the message bean's deployment descriptor or the output ports to include in the deployment descriptors of the message proxies that the message bean uses. In all other cases, the deployer of a message bean decides whether or not to define input and output ports for the message bean and includes the ports in the appropriate deployment descriptors.

A message bean's architecture satisfies a number of specifications that can be categorized as follows.

1. Multiple receivers/subscribers. When a message oriented application sends a message, this message could be received by more than one receiver or subscriber. This means that if the sending application requested a reply, the sending application could receive multiple replies. Message beans should be able to expect a single reply as the result of sending a message, even if multiple receivers sent multiple replies. In addition, combining replies into a single reply could involve application-specific logic.

2. Messaging modes. Message-oriented applications typically communicate asynchronously. Message Beans should be able to use synchronicity as transparently as possible. In particular, a message bean should not have to do anything special to perform synchronous sends (request-reply), asynchronous sends (delayed reply), and asynchronous receives. A message bean may request synchronous receives explicitly, since only the message bean knows when they are necessary.

3. Degree of granularity. Even though message-oriented applications use individual messages as their unit of interaction, it should be possible for message beans to refer to groups of messages as their units of interaction. This way, a message bean is, advantageously, able to interact with message-oriented as well as with object-oriented applications using only interfaces.

4. Specification. Message Beans are able to abstract away the details of the receiving end of an invocation, even at the level of destinations.

5. Transactions. To the extent possible, message beans are permitted to demarcate groups of invocations as individual units of work, regardless of whether these invocations result in message-oriented or object-oriented messages. However, this may result in the need for an extended notion of transactions.

Container-managed messaging for Enterprise Java™ Beans relies on a number of architectural components. These may include: message beans 102, a message repository 104, destinations 108 and 110, a message proxy 104, a result proxy 116, a callback proxy 118, a message bean listener 114, a message context 112 and message ports 120, 122 and 126. These components and their relationships are illustratively shown in FIG. 1.

As described above, the message bean 102 is preferably an Enterprise Java™ Bean (EJB) that communicates with message-oriented applications and other message beans by performing and receiving anonymous invocations with the help of message proxies 104, result proxies 116, callback proxies 118, message bean listeners 114, and the message context 112 of the message bean 102.

Using container-managed reaction, performing anonymous invocations is described as follows. To perform container-managed anonymous invocations, the message bean 102 creates an instance of the message proxy 104 and invokes one of the message proxy's methods. The message proxy 104 abstracts the target of the invocation by associating its methods with target destinations 108 using output ports 122. If the message bean 102 expects a reply, which may be either synchronous or asynchronous, then the message proxy returns either a regular type (which in turn can be a simple type or an object) or a result proxy object from the result proxy 116, respectively, to the message bean 102 as a result of the invocation. This means that the method in the message proxy 104 that the message bean invokes has been defined with the appropriate return type. The result proxy 116 permits the message bean 102 to combine multiple replies into one and to delay the receipt of these replies until the replies are available. Alternatively, a message bean may receive a reply as an anonymous invocation, as outlined below. This means that the method in the message proxy 104 that the message bean 102 invokes has no return type, given that the message bean 102 expects no result to be returned by the message proxy 104.

To receive anonymous invocations, the message bean 102 defines a number of methods that may be invoked as the result of anonymous invocations. Each of these methods is included in the definition of an input port 120 or 126 that indicates the message bean's interest in receiving messages from a particular destination 110. The message bean 102 may receive anonymous invocations asynchronously. To permit a message bean 102 to receive synchronous anonymous invocations, the message bean's message context 112 exposes a receive operation to the message bean 102. The message bean explicitly states in the corresponding input port 126 that one of its methods is to be invoked synchronously.

The message bean 102 may reply to an anonymous invocation by simply returning a value from the method that was invoked as a result of the anonymous invocation. This means that the method to invoke has been defined with the appropriate return type. Alternatively, the message bean 102 can reply to an anonymous invocation by making a request on the callback proxy 118 that the message bean 102 received as an argument to the method to invoke. This means that the method to invoke has been defined to take a callback proxy as a parameter and that the method has no return type, given that the message bean does not intend to return a value as a result of the invocation.

A message bean 102 does not have to reply to an anonymous invocation if the message bean chooses to define the corresponding method to invoke with an incoming callback proxy and no return type. Also, a message bean is not required to define a method to invoke with a return type. This is consistent with the message-oriented paradigm, where a receiver of a message does not have to reply to it even if the message contains a reply-to destination. This means that a message bean that performs an anonymous invocation using a method with a return type on a message proxy should be prepared not to receive a reply. That is, the fact that the message proxy returns a result proxy does not guarantee that a reply is going to arrive.

A message bean can perform an anonymous invocation using bean-managed reaction by invoking a message proxy method that takes a JMS message as an argument. If the message bean expects a result back from the invocation the message proxy's method is defined to return a JMS message. In addition, a message bean can invoke a generic send method on a generic message proxy. This generic method also takes a JMS message argument and can return a JMS message as a result.

A message bean can receive an anonymous invocation using bean-managed reaction by implementing a method that takes a JMS message as an argument. If the method returns a result value, the method can define a JMS message return type. This kind of message bean method is preferably invoked via JMS messages. Thus, this kind of method should not be included in a message bean's EJBObject interface definition. The container 124 knows about a method of this kind from its declaration in a message bean's input port 120.

A Message Bean may be a session EJB or an entity EJB. A feature of a message bean is that it is implicitly shared. That is, given that a message bean serves anonymous invocations that can be delivered as JMS messages and that those JMS messages can be sent by different clients, the message bean is in effect shared by those clients. This means that an EJB that is also a message bean is prepared to serve invocations from more than one client during its lifetime. Entity EJBs are inherently shared so they can also act as message beans. Stateless session beans although inherently non-shareable by virtue of being session beans, can be effectively shared across clients given that they only supply behavior and not state data. However, stateful session beans do not have this property. A stateful session bean keeps track of state data associated with a particular client's session and thus cannot be shared. This means that only stateless session beans and entity beans, but not stateful session beans, can be message beans.

A message repository 106 eliminates the coupling of senders of JMS messages from their receivers which occurs as a result of the need to know the format of the messages that are exchanged. The message repository 106 acts as a neutral third party that stores message formats for senders and receivers to use without them having to know about each other. The message repository 106 also stores associations between message formats and the JMS destinations which corresponding messages can be sent to or received from.

Message formats are specified within the message repository 106 as sequences of pairs of message field names and message field data types. For example, the following message formats could be used by applications that use bank accounts:

[Operation={"debit"},AccountId=long,Amount=double]
[Operation={"credit"},AccountId=long,Amount=double]
[Operation={"getBalance"},AccountId=long]
[Result=Object]
[Exception=Exception]

The message formats may include conventional, application-independent, field names, such as operation, result and exception above. These fields may be used to convey a specific intent via a JMS message and not just plain data. For example, an operation field may be used to convey a specific request of a receiver, namely to perform the specified operation. The value of such a field is a singleton (i.e., in the mathematical sense, a set with only one element) of type String. In other cases, these conventional fields may describe an application independent role for the data they convey, such as the result of a request, or an exception raised in the process of satisfying a request.

Generating interfaces for message proxies and message beans will now be described. A message repository 106 maps message formats that include an Operation field to method signatures. These method signatures may then be grouped into interfaces that are implemented by message proxies 104 and implemented by message beans 102. A message, expressed as a message format and mapped to a method signature, may appear in more than one interface. For example, the following interface groups method signatures that can be mapped from two of the message formats that include an Operation field:

Interface Account
{
   public void debit(long acctId,double amount);
   public void credit(long acctId,double amount);
}

This interface can then be used in the definition of a message proxy that is capable of sending anonymous invocations that may be delivered via JMS messages with the formats shown above.

This interface can also be used in the definition of the EJBObject interface of a message bean that implements its methods to serve anonymous invocations that can be delivered via JMS messages with the given formats.

Method signatures, return values and degrees of transparency will now be described in greater detail. A message bean can perform an anonymous invocation and expect a reply from the anonymous invocation. The most transparent way to express this is by using a method on a message proxy interface that specifies a return type. The signature for such a method is actually mapped from two message formats in a message repository 106: the format of the requesting message and the format of the reply. For example, the following message formats may be used:

[Operation={"getBalance"},AccountId=long]
[Result=double]

These formats may be mapped into the signature of a getBalance method that can be appended to the Account interface as follows:

Interface Account
   public void debit(long acctId,double amount);
   public void credit(long acctId,double amount);
   public double getBalance(long acctId);
}

At this highest degree of transparency, Account can be used by both a message proxy and a message bean's EJBObject. In other words, this same signature for getBalance can be used for both performing and servicing an anonymous invocation. Lower degrees of transparency have different requirements on such a method signature, as follows:

1. Performing asynchronous invocations. Here, a message proxy 104 returns a result proxy object that an invoking message bean can receive without blocking and use at a later time. Thus, the interface implemented by the message proxy 104 defines a method signature that returns a result proxy type, for example:
public DoubleGetterProxy getBalance(long acctId) where DoubleGetterProxy is the interface implemented by the result proxy 116.

2. Returning a result by performing a separate invocation. Here, a message bean 102 uses a callback proxy 118 to return a result, instead of returning as the result of a method. Thus, the interface implemented by the message bean 102 includes a parameter of a callback proxy type, for example:
public void getBalance(long acctId, DoubleSetterProxy callback)
where DoubleSetterProxy is the interface implemented by the callback proxy 118.

3. Receiving a response as a separate invocation. In this case, a message bean 102 does not receive a response from the method the message bean uses to make the invocation, but rather via a separate anonymous invocation. Thus, the interface implemented by the message proxy 104 defines a signature with no return type, for example:
public void getBalance(long acctId) In addition, the interface implemented by the message bean 102 includes a signature for the method to be invoked with the result, for example:
public void receivebalance(double balance) Notice how in this case the message formats for the request and the response are mapped to two separate method signatures.

4. Explicitly triggering the invocation of one of the invocation's methods. In this situation, a message bean 102 uses a generic receive method on its message context 112, so no signature needs to be generated for a message proxy. If the message bean expects a response, the message bean can only get the response via a separate invocation, as in the previous case.

5. Manipulate JMS messages explicitly as anonymous invocation parameters. In this mode, the signature generated from the message formats only takes advantage of the Operation and Result fields, given that the message bean handles the rest of the message's contents explicitly. Thus, the interfaces implemented by the message proxy 104 define a single input parameter, as well as an optional return type, of type Message. For example:
public Message getBalance(Message msg) Notice that, some fields may be factored out of a method's signature. In the case of the message format mapped to getBalance, the only data field maps to such a parameter and this signature may be parameterless, given that there would be no need to pack any data into an input message. Also notice, that although this kind of signature is implemented by a message bean that uses bean-managed reaction to service a corresponding invocation, it is not included in the message bean's EJBObject.

Given that a message repository 106 decouples senders of anonymous invocations from their receivers by virtue of the message formats used, in addition to the decoupling that occurs at run-time, a message proxy 104 can use a different degree of transparency from that used by an EJBObject to define the signature of a particular method the message proxy and the EJBObject include. Thus, for example, while a message proxy could be using container-managed reaction, an EJBObject for a message bean that services this anonymous invocation could be using a callback proxy to return its result.

In some situations message formats include fields that identify a particular object. For example, all three message formats with an Operation field as described above in the example code include an AccountId field. When the method signatures corresponding to these message formats are grouped into an interface, it is convenient to factor out the parameter that the field maps to. For example, the interface Account listed above would become:
Interface Account
{
  public void debit(double amount);
  public void credit(double amount);
  public double getBalance( );
}
If this interface is then implemented by a message proxy, the corresponding constructor would take this parameter and store it for the message proxy 104 to use in subsequent invocations.

If this interface is implemented by a message bean then the parameter does not need to be provided to the message bean. Instead, the message bean's container 124 will extract the corresponding field from an incoming message and use it to identify the instance of the message bean to invoke.

The message proxy 104 hides from the message bean 102 the fact that the message bean 102 is sending anonymous invocations via message-oriented messaging. The message proxy 104 implements an interface defined via the message repository 106.

The message proxy encapsulates the details of what JMS Destination and Connection Factory to use to send messages to, as well as of setting up Connections, Sessions and Message Producers to actually send messages. In addition, this setup behavior is performed any time a message bean is re-activated.

When a method in the message proxy 104 is invoked, the method composes a JMS message that includes a descriptor of the operation the message represents, the arguments that were passed to the invoked method, a unique message identifier, and an optional reply-to destination. The message proxy 104 then sends the composed JMS message to the destination defined in the output port 122 associated with the invoked method.

After composing and sending the appropriate JMS message, a method in the message proxy 104 can handle a reply to the message the message proxy 104 sent according to its return type, which may be:

1. A simple type. In this case the message proxy 104 performs a synchronous receive on a message consumer registered with the reply-to destination defined in the output port 122 associated with the method. Upon receipt of the reply message, the message proxy 104 correlates its message identification (id) with the id of the sent message and returns the value included in the message.

2. A result proxy type. In this case, the message proxy 104 creates an instance of the result proxy 116, provides the result proxy 116 with the reply-to destination in its corresponding output port 122 for the result proxy 116 to listen to, provides the result proxy 116 with the id of the sent message for the result proxy 116 to correlate replies with, and returns the result proxy 116 to the message bean 102.

3. Void. In this case, the output port 122 associated with the method may still define a reply-to destination. If so, then the message proxy 104 creates a MessageListener object to listen for replies and invoke the appropriate method on the message bean 102, provides the listener with the reply-to destination in the listener's corresponding output port 122, for the listener to listen to, and provides the listener with the id of the sent message for the listener to correlate replies with.

A message proxy 104 may also be used to provide a message bean 102 with exception handling. For any of its methods that throws an exception, the message proxy 104 performs a synchronous receive after sending the corresponding message to block until a reply arrives that correlates with the id of the sent message. If the reply includes an exceptional value then the message proxy 104 throws an exception. Otherwise the message proxy 104 includes the following choices, depending on the return type of the method:

1. If the method returns a simple type, the message proxy 104 returns the value included in the reply.

2. If the method returns a result proxy, the message proxy 104 creates a result proxy, sets the result proxy value to return to the value included in the reply, and returns the result proxy to the message bean 102.

3. If the method has return type void, the message proxy 104 creates a MessageListener object (object implementation of a message listener) to invoke the appropriate method on the message bean 102 as described above and invokes a method, onMethod, which is called by JMS for notification of a message arrival at a destination and delivery of the message itself. The onMethod is invoked on the message bean 102 passing the message bean 102 the received message.

Given that the message proxy 104 blocks until a potentially exceptional result arrives; exception handling is provided for synchronous send (request reply). Exception handling for asynchronous send (delayed reply) employs additional support from either the programming model, i.e., using joining threads, for example, or from the programming language itself. Also, given that an exceptional reply may not arrive, a message proxy 104 includes a means for timing out in the case where no other kind of reply is expected.

If a method implemented by a message proxy 104 throws an exception, the corresponding output port 122 defines a reply-to destination that receivers can reply to with potential exceptional values.

If a message proxy 104 implements an interface that defines methods whose signatures omit a common reference, for example, "interface Account" in the example code given above, then the constructor of the message proxy 104 takes that reference as an argument. The message proxy 104 stores this reference and includes the reference in the messages that are sent as a result of the message proxy's methods being invoked. For example:
AccountBean sourceAcct=new AccountBean(sourceAcctId); sourceAcct.debit(amount);
The first line of this code fragment creates an instance of a message proxy 104 that implements the Account interface. As a result of this creation, the sourceAcct message proxy stores the value of sourceAcctId which is then used in the second line to create a message containing "debit", sourceAcctId and amount.

Message proxy is supported for bean-managed reaction. To permit a message bean 102 to perform anonymous invocations using bean-managed reaction, a generic message proxy is provided that defines send methods that take as arguments a JMS message and an output port object. A generic send method can either define no return value or it can return a JMS message. The message proxy 104 is responsible for sending the given message via the given output port 122 and, if the send method returns a message, for performing a synchronous receive on the output port's reply-to target, correlating the received reply message and returning the received reply message to the message bean 102. A generic message proxy also provides a message bean with methods to create instances of the different kinds of JMS messages. A generic message proxy is provided a deployment descriptor with all the output ports that are used by the message bean in its bean-managed generic send invocations.

A regular message proxy also allows a message bean to perform bean-managed reaction invocations by implementing methods defined in its interface that take and can return a JMS message. When one of these methods is invoked, a message proxy writes the name of the operation on the argument message as well as any reference that may have been given to the message proxy in its constructor. After doing this, the message proxy behaves like a generic message proxy handling a generic send method, including the potential handling of a reply message.

A result proxy 116 permits the message bean 102 to perform synchronous sends (request-reply) and asynchronous sends (delayed reply) transparently. The result proxy 116 also allows the message bean to receive multiple replies, and the result proxy 116 hides from the message bean 102 the identification and correlation of messages and replies.

A method in a message proxy's interface that returns a value does so by returning a result proxy object. When a message bean 102 invokes such a method, the message proxy 104 creates an instance of the result proxy and, after returning the instance, permits the message bean 102 to continue its computation. When the message bean 102 needs to use the result of the invocation, the message bean 102 invokes a method on the result proxy 116 that blocks unless or until the result proxy 116 has a result ready. In addition, any combination logic that is needed to turn multiple replies into a single reply can be coded into the result proxy 116, including encoding how many receivers could send replies and determining when all replies have arrived.

The callback proxy 118 permits the message bean 102 to reply to an anonymous invocation by performing a separate invocation. If the message bean 102 wants to reply to an anonymous invocation using the callback proxy 118 then the message bean 102 can define the signature of the method to invoke to take a callback proxy object as an argument, which the message bean can then invoke callback methods on.

When the anonymous invocation is received, the container 124 creates an instance of the callback proxy 118 before calling the method to invoke on the message bean 102. The container 124 provides the callback proxy 118 with the reply-to destination included in the anonymous invocation, which the callback proxy 118 can use as the target of the message the callback proxy 118 sends as a result of one of its methods being called. The container 124 also provides the callback proxy 118 with the id of the message sent as a result of the original anonymous invocation. The callback proxy 118 then uses this message id as a correlation id to include in the message sent as a result of the callback. The container 124 of the message bean 102 that sent the original invocation uses the correlation id to determine whether to invoke the appropriate method on the message bean 102 as a result of the callback.

A destination is an abstract location where anonymous invocations are received from and where the anonymous invocations are sent to. A destination is either a source 110 or a target 108. The source 110 is a destination used to define an input port 120 or 126, from which anonymous invocations are received. A target 108 is a destination used to define an output port 122, to which anonymous invocations are sent.

In JMS, a destination corresponds to a JMS destination, which in turn can be either a queue or a topic (for point-to-point and publish/subscribe, respectively). Non-message bean clients (such as existing MQ applications) can perform anonymous invocations on message beans by sending JMS messages to JMS destinations, and the non-message bean clients can receive anonymous invocations from message beans by receiving JMS messages from JMS destinations. Destinations 108 and 110 are associated with destination managers (included in blocks 108 and 110) that handle the communication between a destination and its clients, including connectivity, security, and identity. A destination manager can either be a source manager (110) or a target manager (108). In JMS, a destination manager corresponds to a combination of a JMS Connection Factory and a JMS Connection. A message bean configures a destination manager for one of its input or output ports by naming a JMS Connection Factory.

Message ports (input and output ports) address specification requirements, the message ports abstract away the source and target of anonymous invocations and permit the reconfiguration of sources and targets dynamically at run-time. Message ports can be either input ports 120, 126 or output ports 120.

An input port 120 or 126 associates destinations 110 that are sources of messages with methods to invoke when those messages arrive. Input ports 126 are named to identify the destinations 108 with the message context 112. An input port provides operations for dynamically reconfiguring its source of anonymous invocations.

An output port 122 specifies at least one target for invocations made via a message proxy's method, and the output port 122 optionally specifies a reply-to target that receivers can use to reply to the invocation. Output ports 122 are named to identify them with a message proxy 104. The output port(s) 122 provides operations for dynamically reconfiguring its send targets and its reply-to target.

A message bean listener 114 behaves as an adapter that turns incoming JMS messages into method invocations on a message bean 102. As such, the message bean listener 114 listens, by implementing the JMS MessageListener interface, for messages arriving at a destination 110 specified in a message bean's input port 120, the message bean listener 114 unpacks a message, determines the instance of the message bean to invoke and invokes the appropriate method passing the data items in the message as parameters. If the invoked method returns a value, the message bean listener 114 packs the value into a JMS message, determines the destination to send the reply to and the correlation id to include in the reply message, and sends the reply. If the invoked method throws an exception, the message bean listener 114 treats the exception object as a return value and sends the return value back as a reply message. To differentiate a result message from an exception message sent back as a reply, the conventional "Result" and "Exception" labels are used respectively to tag the objects packed in the reply message.

A message bean container 124 activates an instance of the message bean listener 114 if only and only if the corresponding input port 120 specifies a message bean listener class name. When the listener 114 receives a JMS message, via the invocation of its onmessage method, the listener 114 determines whether or not the message bean 102 that the listener 114 is going to invoke is active. If the message bean is not active then it activates one before making the invocation. In effect, this behavior provides a message bean with an auto-instantiation capability, which becomes a layer of activation management above that provided by the message bean's EJB container 124.

Message bean listeners 114 are active for a message bean to receive any asynchronous JMS message delivering an anonymous invocation. On the other hand, if each message bean 102 was provided a message bean listener instance for each one of its methods, the amount of message bean listener objects in memory would become unmanageable. Thus, a default policy of the message bean container 124 is to provide a single instance of a message bean listener 114 per method per message bean class. One reason the message bean listener 114 is needed per method is that, given that a message bean method corresponds to an anonymous invocation and assuming each JMS message format used to deliver anonymous invocations corresponds to a separate JMS destination, associating a message bean listener with more than one method would result in the listener receiving concurrent onMessage calls that could not be made thread safe.

A message bean listener 114 manages its message bean instances depending on the type of EJB the message Bean is:

1. Entity Bean. The message bean listener 114 maintains a map of message beans indexed by the field or fields in the message formats that this message bean can receive and that identify the instance of the message bean to use. For example, an Account Message Bean Listener would maintain a map of Account Message Beans indexed by AccountId.

2. Stateless Session Bean. The message bean listener 114 only needs to maintain a single instance of the message bean.

3. Stateful Session Bean. This combination is disallowed.

To permit a message bean 102 to service anonymous invocations using bean-managed reaction, a message bean listener 114 passes a JMS message the message bean listener 114 receives unpacked onto the corresponding method in the message bean. However, the message bean listener 114 does read from the JMS message the Operation field to verify that the message bean's method should indeed be invoked and, in the case of a message bean that is also an entity bean, the fields that identify the message bean to invoke. Thus, such fields become redundant in the message bean's method.

If a message bean's method using bean-managed reaction returns a JMS message, the message bean listener 114 that invokes the message bean writes the message id of the original message on the returned message as its correlation id and sends the returned message to the reply-to destination included in the original message.

A message context 112 allows a message bean 102 to explicitly trigger the invocation of one of message bean's methods by providing the message bean with receive operations that the message bean can invoke on demand. The message context 112 also permits the message bean 102 access to its input ports 120.

Referring to FIG. 2, a block/flow diagram for employing the integration mechanism in accordance with the invention is shown. FIG. 2 includes servicing invocations by a message bean in accordance with the invention. In block 202, the object-oriented components i.e., message bean, receives invocations and may receive the invocation pursuant to its own request. In block 204, a check is made to determine if the invocation is message oriented. If message oriented, a message bean listener is employed in block 206 to adapt the invocation. The invocations preferably include java™ message system (JMS) messages. If this is the case, a message bean listener is employed for adapting the java™ message system messages for performance by the message beam. In block 208, invocations are serviced by object-oriented components or message beans. The message beans are unaware of the sender being a message-oriented client or an object-oriented component. In block 210, it is determined if a reply to the invocation is needed. If a reply to the invocation is needed, it is determined if the reply is to employ a separate invocation in block 212. If a separate invocation is not needed, a reply to the invocation is completed by returning a result to the message bean in block 216. If a separate invocation is appropriate, a reply to the invocation is sent using a helper object, such as a result proxy object or a callback proxy object.

Referring to FIG. 3, a block/flow diagram for employing the integration mechanism in accordance with the invention is shown. FIG. 3 includes performing invocations by a message bean in accordance with the invention. In block 302, a message bean obtains an instance of a message proxy. In block 304, the message bean performs the invocation without being aware of the receiver being a message oriented client or an object oriented component. In block 306, the message proxy adapts the invocation as described in detail above. If a reply is needed, as determined in block 308, it is determined if the reply should be received synchronously or asynchronously in block 310. If a synchronous reply is needed, the message proxy receives the reply in block 312 and returns the reply to the message bean in block 318. If the reply is to be received asynchronously, the message proxy returns a helper object in block 314 and the message bean requests the reply from the helper object. A message bean both performs and services invocations.

The following section sets forth an illustrative Application Programming Interface (API) for a banking program which employs the present invention.

MessageProxy

A generic message proxy used in bean-managed reaction invocations defines a generic interface.

interface MessageProxy
{
public StreamMessage createstreamMessage( );
public MapMessage createMapMessage( );
public TextMessage createTextMessage( );
public TextMessage createTextMessage(StringBuffer buffer
public ObjectMessage createObjectMessage( );
public ObjectMessage createObjectMessage(Serializable object);
public BytesMessage createBytesMessage( );
public void send(Message msg,MessageOutputPort port);
public void send(Message msg,String portName);
public Message send(Message msg,MessageOutputPort port);
public Message send(Message msg,String portName);
}

MessageContext

A message bean uses a message context when the message bean wants to perform synchronous receiving of messages or when the message bean wants to obtain one of its input or output ports. The MessageContext interface is implemented by a message bean's EJB Context and it extends either the SessionContext or the EntityContext interfaces.

When a Message Bean wants to make a request on its Message Context, it first casts its EJB Context that was received in the setSessionContext or setEntityContext methods to a Message Context.

Interface MessageContext extends SessionContext
}
public void receive(MessageInputPort port);
public void receive(String portName);
public MessageInputPort getInputPort(String portName);
public MessageoutputPort getOutputPort(String portName);
interface MessageContext extends EntityContext
{
public void receive(MessageInputPort port);
public void receive(String portName);

```
public MessageInputPort getInputPort(String portName);
public MessageOutputPort getOutputPort(String
portName);
}
```
MessagePort Ports allow setting the sources and targets of anonymous messages at run-time, as well as reply-to information. Initial values for input and output ports are taken from the deployment descriptor. Each time a source or target is set or added, the corresponding JMS Destination is looked up, a connection and a session are created, and a receiver or sender is created. Each time a source is reset or a target is removed, the corresponding connection is closed.

```
interface MessagePort
{
}
```

MessageInputPort

A method defined on a message bean for the container to invoke on a received anonymous invocation can have one input port associated with it.

```
interface MessageInputPort extends MessagePort
{
public void setSource(String source,String sourceMgr);
public String getSource( );
}
```

MessageOutputPort

An output port can be associated with one or more targets.

```
interface MessageOutputPort extends MessagePort
{
public void addTarget(String target,String targetMgr);
public void setReplyTo(String replyTo,String replyToMgr);
public void removeTarget(String target);
public String[ ] getTargets( );
public String getReplyTo( );
}
```

Deployment Descriptor

A message bean's deployment descriptor lists the message bean's input ports. For each input port, the deployment descriptor lists its source destination, source destination manager, method to invoke, and the message bean listener implementation class associated with that method. A message bean's deployment descriptor also lists the references to the message proxies it uses. Each message proxy reference lists the interface implemented by the message proxy and the class that implements it. For example:

```
InputPorts=TransferReceiver
TransferReceiver.source=transfers
TransferReceiver.sourceManager=acctTopicsManager
TransferReceiver.methodToInvoke=performTransfer
TransferReceiver.listenerClassName=
PerformTransferListenerImpl
MessageProxies=Account
Account.proxyInterfaceName=AccountProxy
Account.proxyClassName=AccountProxyImpl
```

A message bean's deployment descriptor is included in its EJB deployment descriptor, which further qualifies the EJB as a message bean.

A message proxy's deployment descriptor lists the message proxy's output ports. For each output port, the deployment descriptor lists the target destination, target destination manager, an optional reply-to target, and the method in the message proxy that triggers a send using the given output port. For example:

```
OutputPorts=GetBalanceSender
GetBalanceSender.target=getBalances
GetBalanceSender.targetManager=acctTopicsManager
GetBalanceSender.replyTo=balances
GetBalanceSender.sendMethod=getBalance
```

The present invention describes a component model that provides container managed messaging capability. With the present invention, software components may be built that can provide services by responding to messages (or generalized events) in addition to providing methods that implement useful functions, such as business logic. Rather than defining this component model or integration mechanism based on a single MOMW scheme, the model is presented in terms of concepts defined in the Java™ Messaging System (JMS) specification. JMS provides a unified view of commercial messaging systems, using both point-to-point and publish/subscribe styles. Thus, any server that supports enterprise Java™, e.g., EJS, and includes an implementation of JMS on some specific, underlying messaging system (e.g., MQ or Message Broker systems) will be capable of supporting the present invention. In accordance with the invention, customers will have the ability to build component based applications which make use of both object-oriented application servers and message-oriented integration of existing applications and existing messaging systems. Further, the present invention provides a unified middleware platform.

Having described preferred embodiments of an integration mechanism for object-oriented software and message-oriented software (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for anonymously integrating object-oriented software components and message-oriented clients wherein a first object-oriented component performs the steps comprising of:

performing invocations which are serviced by one of message-oriented clients and object-oriented components;

servicing the invocations which are performed by one of the message-oriented clients and the object-oriented components such that the first object-oriented component is unaware that the invocations are performed and serviced by one of the message-oriented clients and the object-oriented components.

2. The method as recited in claim 1, further comprising the step of receiving asynchronous replies to the invocations performed by the first object-oriented component by employing a helper object.

3. The method as recited in claim 1, further comprising the step of replying to the invocations serviced by the first object-oriented component by performing separate invocations.

4. The method as recited in claim 1, further comprising the step of receiving asynchronous replies to the invocations performed by the first object-oriented component by receiving separate invocations.

5. The method as recited in claim 1, wherein the invocations are received and serviced synchronously by the first object-oriented component.

6. The method as recited in claim 1, further comprising the steps of:

requesting to receive the invocations by the first object-oriented component; and receiving the invocation pursuant to the request by the first object-oriented component.

7. The method as recited in claim 1, wherein the first object-oriented component includes a message bean.

8. The method as recited in claim 1, wherein the step of servicing the invocations includes the step of creating an instance to obscure sender information of the invocations by employing a message proxy to interface between the first object-oriented component and a destination of the invocations.

9. The method as recited in claim 1, wherein the invocations include java™ message system messages and the method further comprising the step of providing a message bean listener for adapting the java™ message system messages for performance by the first object-oriented component.

10. A program storage device readable by machine, tangibly embodying a program of instructions executable by the machine to perform method steps for anonymously integrating object-oriented software components and message-oriented clients wherein a first object-oriented component performs the method steps comprising:

performing invocations which are serviced by one of message-oriented clients and object-oriented components;

servicing the invocations which are performed by one of the message-oriented clients and the object-oriented components such that the first object-oriented component is unaware that the invocations are performed and serviced by one of the message-oriented clients and the object-oriented components.

11. The program storage device as recited in claim 10, further comprising the step of receiving asynchronous replies to the invocations performed by the first object-oriented component by employing a helper object.

12. The program storage device as recited in claim 10, further comprising the step of replying to the invocations serviced by the first object-oriented component by performing separate invocations.

13. The program storage device as recited in claim 10, further comprising the step of receiving asynchronous replies to the invocations performed by the first object-oriented component by receiving separate invocations.

14. The program storage device as recited in claim 10, wherein the invocations are received and serviced synchronously by the first object-oriented component.

15. The program storage device as recited in claim 10, further comprising the steps of:

requesting to receive the invocations by the first object-oriented component; and receiving the invocation pursuant to the request by the first object-oriented component.

16. The program storage device as recited in claim 10, wherein the first object-oriented component includes a message bean.

17. The program storage device as recited in claim 10, wherein the step of servicing the invocations includes the step of creating an instance to obscure sender information of the invocations by employing a message proxy to interface between the first object-oriented component and a destination of the invocations.

18. The program storage device as recited in claim 10, wherein the invocations include java™ message system messages and the method further comprising the step of providing a message bean listener for adapting the java™ message system messages for performance by the first object-oriented component.

19. A method for anonymously performing and servicing invocations comprising the steps of:

providing a message bean listener for receiving and replying to an invocation from a source destination;

passing the invocation from the message bean listener to a message bean, wherein upon determining the invocation to be a message-oriented invocation, the message bean listener adapts to invocation to the message bean before passing the invocation, and wherein the message bean is object-oriented;

permitting the message bean to obtain an instance of a message proxy on which the message bean invokes a method to associate the invocation with a target destination; and replying to the message bean from a message proxy, when the message bean expects a reply to the invocation, wherein the message bean is unaware of the identity of one of a message-oriented client and an object-oriented component that one of services and performs the invocation.

20. The method as recited in claim 19, further comprising the step of storing message formats that are mapped to and from signatures for methods to be implemented by message proxies and message beans.

21. The method as recited in claim 19, wherein the step of replying to the message bean includes the step of receiving asynchronous replies to the invocations performed by the message bean by employing a helper object.

22. The method as recited in claim 19, wherein the step of replying to the message bean includes the step of replying by performing separate invocations by employing a helper object.

23. The method as recited in claim 19, wherein the step of replying to the message bean includes the step of receiving asynchronous replies to the invocations performed by the message bean by receiving separate invocations.

24. The method as recited in claim 19, wherein the invocations are received and serviced synchronously by the message bean.

25. The method as recited in claim 19, further comprising the steps of:

requesting to receive the invocations by the message bean; and receiving the invocations pursuant to the request by the message bean.

26. A program storage device readable by machine, tangibly embodying a program of instructions executable by the machine to perform method steps for anonymously performing and servicing invocations, the method steps comprising:

providing a message bean listener for receiving and replying to an invocation from a isource destination;

passing the invocation from the message bean listener to a message bean, wherein upon determining the invocation to be a message-oriented invocation, the message bean listener adapts to invocation to the message bean before passing the invocation, and wherein the message bean is object-oriented;

permitting the message bean to obtain an instance of a message proxy on which the message bean invokes a method to associate the invocation with a target destination; and replying to the message bean from a message proxy, when the message bean expects a reply to the invocation, wherein the message bean is unaware of the identity of one of a message-oriented client and an object-oriented component that one of services and performs the invocation.

27. The program storage device as recited in claim 26, further comprising the step of storing message formats that are mapped to and from signatures for methods to be implemented by message proxies and message beans.

28. The program storage device as recited in claim 26, wherein the step of replying to the message bean includes the step of receiving asynchronous replies to the invocations performed by the message bean by employing a helper object.

29. The program storage device as recited in claim 26, wherein the step of replying to the message bean includes the step of replying by performing separate invocations by employing a helper object.

30. The program storage device as recited in claim 26, wherein the step of replying to the message bean includes the step of receiving asynchronous replies to the invocations performed by the message bean by receiving separate invocations.

31. The program storage device as recited in claim 26, wherein the invocations are received and serviced synchronously by the message bean.

32. The program storage device as recited in claim 26, further comprising the steps of:

requesting to receive the invocations by the message bean; and receiving the invocations pursuant to the request by the message bean.

* * * * *